(12) United States Patent
Mackenzie et al.

(10) Patent No.: US 7,831,998 B2
(45) Date of Patent: Nov. 9, 2010

(54) CHANGING STATES OF COMMUNICATION LINKS IN COMPUTER NETWORKS IN AN AUTHENTICATED MANNER

(75) Inventors: Philip Mackenzie, San Jose, CA (US); Zulfikar Amin Ramzan, San Mateo, CA (US); Craig B. Gentry, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1062 days.

(21) Appl. No.: 11/531,435

(22) Filed: Sep. 13, 2006

(65) Prior Publication Data

US 2007/0169177 A1    Jul. 19, 2007

Related U.S. Application Data

(60) Provisional application No. 60/717,902, filed on Sep. 16, 2005.

(51) Int. Cl.
*G06F 7/04* (2006.01)
*G06F 17/30* (2006.01)

(52) U.S. Cl. .......................... 726/3; 713/168; 709/218; 709/239; 710/105

(58) Field of Classification Search ........................ None
See application file for complete search history.

(56) References Cited

U.S. PATENT DOCUMENTS 4,872,006 A    10/1989    Takao

| | | |
|---|---|---|
| 5,311,593 A | 5/1994 | Carmi |
| 5,666,416 A | 9/1997 | Micali |
| 6,584,507 B1 * | 6/2003 | Bradley et al. ............... 709/229 |
| 6,959,384 B1 * | 10/2005 | Serret-Avila ................ 713/176 |
| 2008/0250239 A1 * | 10/2008 | Risan et al. .................. 713/153 |

OTHER PUBLICATIONS

FIPS 180-1, Secure Hash Standard. U.S. Department of Commerce/NIST, 1995.
IEEE 802.11, 1999 Edition. Wireless LAN Medium Access Control (MAC) and Physical Layer (PHY) specifications. IEEE Computer Society, 1999.
R. C. Merkle. Protocols for Public-Key Cryptography. In IEEE Symposium on Security and Privacy, 1980.
S. Micali. Efficient Certificate Revocation. In Proceedings of the RSA Data Security Conference 1997.

* cited by examiner

*Primary Examiner*—Nasser Moazzami
*Assistant Examiner*—Fikremariam Yalew
(74) *Attorney, Agent, or Firm*—Haynes and Boone, LLP; Michael Shenker

(57) ABSTRACT

A protocol for closing all active communication links between one device (110.1) and one or more other devices in a group provides that the first device sets up the group by generating an input to a predefined function (e.g. one-way function) according to some random distribution, computing the output of the one-way function, and sharing the output value with all other devices in the group. Then to close all communication links, the first device broadcasts the stored input to all other devices in the group. The other devices may check that the one-way function applied to this input results in the shared output value, and if so, close the communication link.

23 Claims, 4 Drawing Sheets

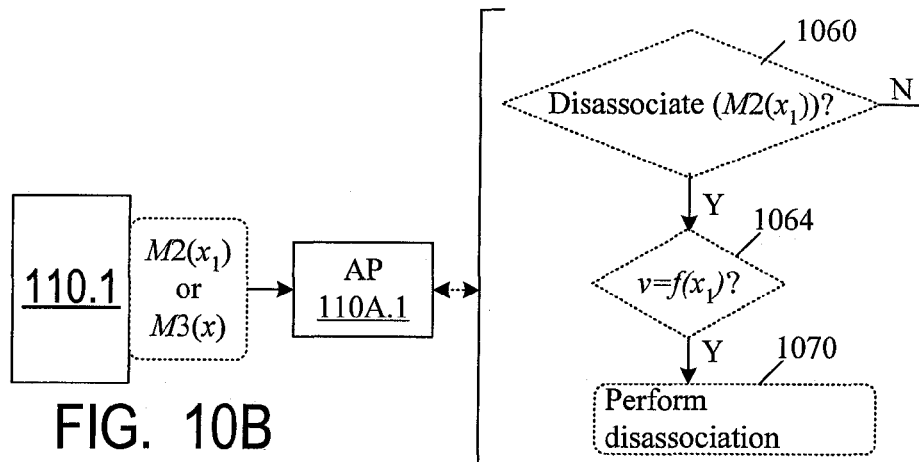
FIG. 10B
$M2(x_1)$:
| Disassociate | $x_1=f(x)$ |
FIG. 11
$M3(x)$:
| Deauthenticate | $x$ |
FIG. 12
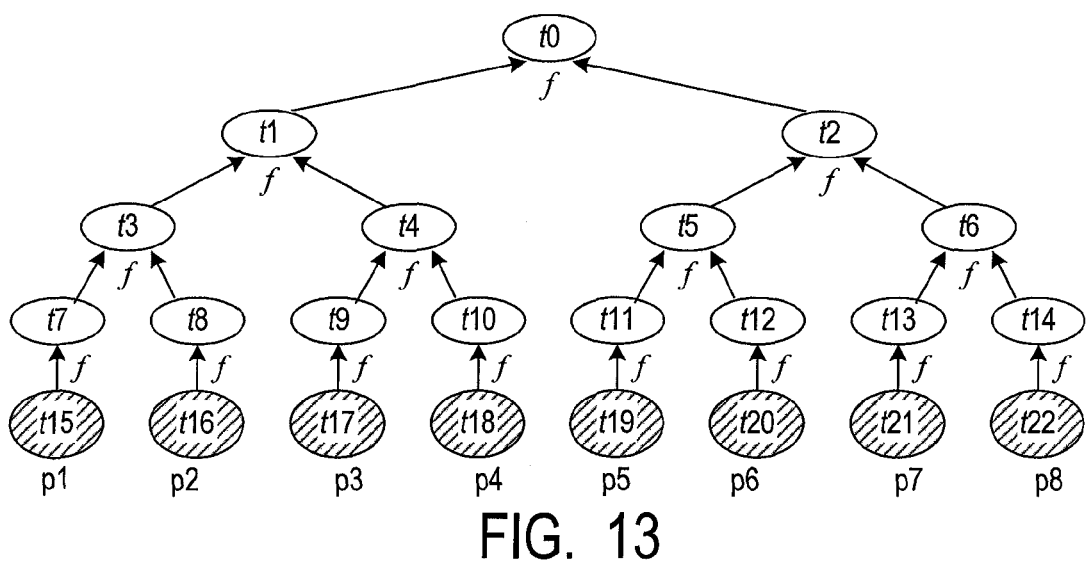
FIG. 13

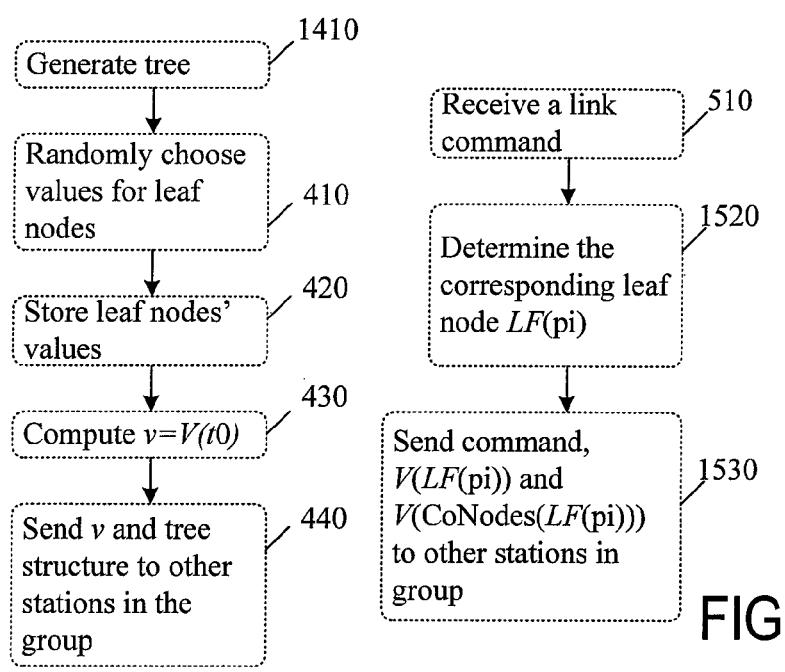
FIG. 14
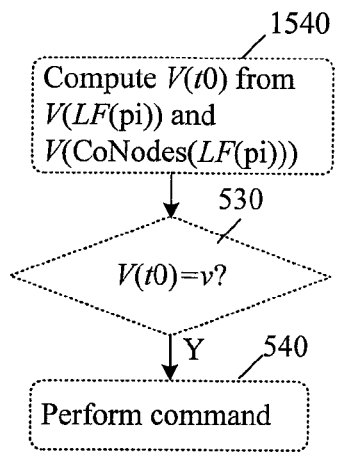
FIG. 15B
FIG. 15A
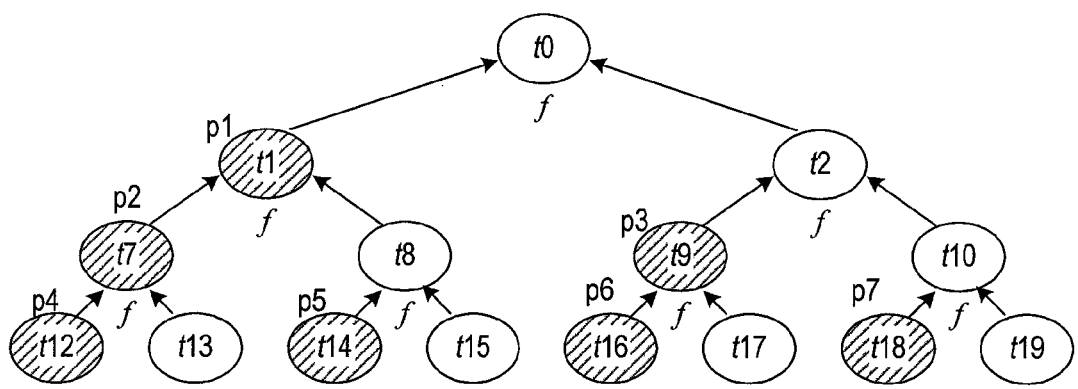
FIG. 16
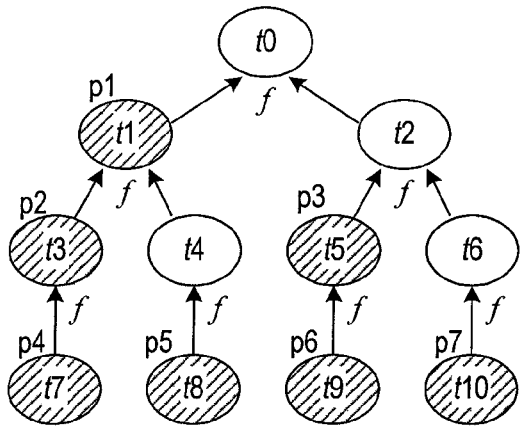
FIG. 17

CHANGING STATES OF COMMUNICATION LINKS IN COMPUTER NETWORKS IN AN AUTHENTICATED MANNER

CROSS REFERENCE TO RELATED APPLICATIONS

The present application claims priority of U.S. provisional application No. 60/717,902, filed Sep. 16, 2005, incorporated herein by reference.

BACKGROUND OF THE INVENTION

The present invention relates to communication networks, and more particularly to managing a communication link between devices on a network.

Computer networks, including digital networks, and particularly wireless networks, are vulnerable to attacks by imposters.

In the prior art, there are a number of methods for closing authenticated secure communication links between a first device and one or more other devices in an insecure network. For example, a first device may send an unauthenticated message to each other device to request closing of the communication link. If there is more than one other device, then this unauthenticated message may be broadcast to all of these other devices. Such a system is vulnerable to an attacker who sends a link closing request to these other devices, purporting to be the first device. By causing the other devices to close their links, the attacker has effectuated a denial-of-service attack.

Another method requires a device requesting a link closing to send an authenticated message. However, if only symmetric key authentication is used (as, for example, in the IEEE 802.11 standard described in [2]), and if there is more than one communication link to be closed, then there are two possible cases that could be considered. In the first case, each pair of devices shares a pairwise private key. In this case, the first device must send an individual authenticated message to each other device, each message authenticated with the appropriate pairwise private key. This is not as efficient as a broadcast. In the second case, all devices share a group private key, where a group private key is a key known to all devices in the group, but no other devices. In this case, the first device could broadcast an authenticated message to all other devices in the group. However, this system is vulnerable to an attacker who controls one of the other devices, and thus holds the group key. This attacker could broadcast a link closing request to the other devices, purporting to be the first device. Again, by causing the other devices to close their links, the attacker has effectuated a denial-of-service attack.

SUMMARY

This section summarizes some features of the invention. The invention is defined by the appended claims.

It is possible to use public key authentication to achieve security for closing authenticated secure communication links between more than two devices on an insecure network. However, public key authentication is generally much more computationally expensive than symmetric key methods, and could lead to denial-of-service attacks by forcing devices to perform expensive operations to verify authenticated messages.

In the prior art, there have also been methods for proving that certain certificates in a public-key infrastructure (PKI) have been revoked. This method involves creating a certificate which includes a certificate authority's signature on a public key, as well as a value which is the output $c_0$ of an iterative application of a one-way functions $f$; see [4] (the bracketed numbers refer to documents listed at the end before the claims). Let $f^i$ denote the i-fold composition; that is, $f^i(x)=x$ for i=0, and $f^i(x)=f(f^{i-1}(x))$ for i>0. Then for some pre-defined n>1, we define $$c_0 = f^n(x)$$

where x is a random number generated by the certificate authority. The value $c_0$ is inserted in the certificate. Let i be some later period of time. In order to prove that the certificate is still valid in time period i, the certificate authority reveals $c_i = f^{n-i}(x)$. The verifier then checks that $f^i(c_i)=c_0$ to ascertain the certificate validity. It is computationally infeasible for an adverse party to compute $c_j$ from $c_i$ for j>i because this computation involves reversal of $f$, which is a one way function. Therefore, if the certificate is revoked after the period i (i.e. when $c_i$ has been revealed), the adverse party cannot use the proof $c_i$ to deceptively prove that certificate is still valid.

The present invention provides a protocol for closing all active communication links between one device and one or more other devices in a group. According to one embodiment, the first device generates an input to a one-way function according to some random, uniform or non-uniform, probabilistic distribution, computes the output of the one-way function, and shares the output value with all other devices in the group, where the one-way function may be a cryptographic hash function. The first device stores the input to the one-way function. Then to close all communication links, the first device broadcasts the stored input to all other devices in the group. The other devices may check that the one-way function applied to this input results in the shared output value, and if so, close the communication link.

Thus, some embodiments of the present invention provide a mechanism for closing a communication link which avoids a denial-of-service attack by an imposter sending a link closing request, and is more efficient than either public-key authentication techniques or sending individual authenticated messages to each party.

The invention is not limited to such embodiments. Some embodiments provide a computer-implemented method for securely modifying a state of one or more communication links by a group of computer systems in a computer network, the group comprising a first computer system and one or more other computer systems, the method comprising (1) the first computer system randomly selecting one or more first values; (2) the first computer system computing a group value as a first function of the one or more first values; (3) the first computer system performing a network transmission for providing the group value but not the one or more first values to the one or more other computer systems; (4) after the operation (3), the first computer system obtaining a command for changing a state of one or more of the communication links; (5) in response to the command, the first computer system performing a network transmission to the one or more other computer systems for providing an indication to change the state of the one or more of the communication links, the indication comprising authentication data to authenticate the indication to the one or more other computer systems, the authentication data comprising one or more second values which are either (i) one or more first values, or (ii) intermediate values obtained in computing the group value in the operation (2). In some embodiments, the method further comprises at least one of the computer systems in the group: obtaining a cryptographic key as a predefined identity or non-identity function of the group value; and transmitting and/or receiving a message to or from a computer system in the group, and performing a cryptographic operation on the message with the cryptographic key, the cryptographic operation comprising at least one of (i) encrypting the message, (ii) decrypting the message, (iii) generating a digital signature on the message, (iv) verifying a digital signature on the message. In some embodiments, the operation (5) comprises the first computer system determining whether the command is for performing a first type of change of the state of the one or more communication links or a second type of change of the state of the one or more communication links; wherein the one or more second values depend on whether the command is for performing the first type of change or the second type of change. In some embodiments, the first function is a one-way function with respect to a probabilistic distribution used to randomly select the one or more first values. In some embodiments, the one or more communication links include a wireless link. In some embodiments, the first computer system is mobile.

Some embodiments provide a computer-implemented method for securely modifying a state of one or more communication links by a group of computer systems, the group comprising at least a first computer system and a second computer system, the method comprising: (1) the second computer system obtaining a group value via a network transmission from the first computer system; (2) after the operation (1), the second computer system receiving a network transmission comprising an indication to change the state of the one or more communication links, the indication comprising authentication data to authenticate the indication to the second computer system, the authentication data comprising one or more authenticating values; (3) the second computer system computing a predefined function of the one or more authenticating values and determining whether or not the predefined function of the one or more authenticating values is in a predefined relationship to the group value; (4) if the predefined function of the one or more authenticating values is in a predefined relationship to the group value, then the second computer system processing the indication as a valid indication, and otherwise the second computer system processing the indication as an invalid indication. In some embodiments, the method further comprises the second computer system transmitting and/or receiving a message over a network and performing a cryptographic operation on the message with a key equal to the group value or a value obtained by the second computer system from the group value, the cryptographic operation comprising at least one of (i) encrypting the message, (ii) decrypting the message, (iii) generating a digital signature on the message, (iv) verifying a digital signature on the message. In some embodiments, the operation (3) comprises the second computer system determining whether the indication is for a first type of change of the state of the one or more communication links or a second type of change of the state of the one or more communication links; wherein the predefined function depends on whether the indication is for the first type of change or the second type of change.

The invention includes computer systems adapted to perform the methods described above; data carriers with computer data values described above; and data carriers with computer instructions (e.g. computer programs) for computers to perform the methods described above. The data carriers may include computer readable media (disks, semiconductor memories, and other types, known or to be invented) and network links (including wire and wireless links). The computer programs can be carried by the network links.

The invention is not limited to the features and embodiments described above, but is defined by the appended claims.

BRIEF DESCRIPTION OF THE DRAWINGS

FIG. 10B shows data flow and operations performed by network stations according to some embodiments of the present invention.

FIGS. 11, 12 illustrate data transmitted according to some embodiments of the present invention.

FIG. 13 shows a hash tree used in some embodiments of the present invention.

FIGS. 14, 15A, 15B are flowcharts of methods executed by network stations according to some embodiments of the present invention.

FIGS. 16, 17 show hash trees used in some embodiments of the present invention.

DESCRIPTION OF SOME EMBODIMENTS

The embodiments described in this section illustrate but do not limit the invention. The invention is defined by the appended claims.

Some embodiments of the present invention provide a mechanism for closing all active communication links between one device and one or more other devices in a group of devices that have agreed on some common value ("group value"). In some embodiments, this mechanism avoids a denial-of-service attack by an imposter sending a link closing request, and is more efficient than methods in the prior art.

Figure 1:
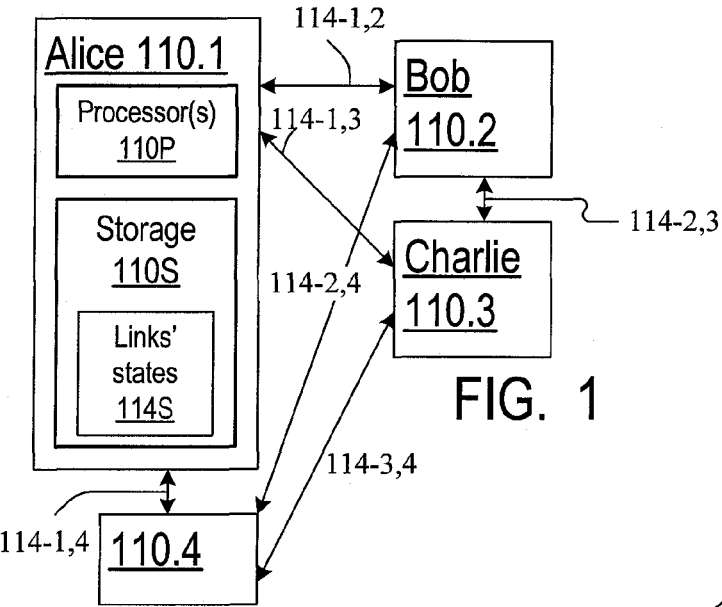
FIG. 1 is a block diagram of a network of stations for some embodiments of the present invention.

FIG. 1 illustrates a group of four devices 110, i.e. 110.1, 110.2, 110.3, 110.4. In this example, device 110.1 is operated by a user "Alice", device 110.2 is operated by "Bob", device 110.3 by "Charlie", and device 110.4 by some other user, or by no user. Devices 110 communicate with each other over network links 114 (114-1,2, 114-2,3, etc.). Link 114-1,2 carries traffic between devices 110.1, 110.2. More generally, each link 114-i,j (ij=1,2,3,4) carries traffic between the respective devices 110.i, 110.j. Each device 110 includes a computer system having one or more computer processors 100P executing computer instructions. The computer system also includes computer storage 110S (semiconductor memory, magnetic or optical disks, and/or other types of storage) to store computer instructions executed by processor 110P and also to store data. A device 110 may also include some user interface (e.g. a keyboard and a screen) for communicating with a human user. Different devices 110 may be identical or different from each other. Links 114 may be unidirectional or bi-directional. For example, one of devices 110 may be a printer or a TV set which receives, but does not transmit, network messages. In this case, a unidirectional link 114 may be suitable.

Figure 2:
FIG. 2 shows a frame transmitted over a network of FIG. 1 in some embodiments of the present invention.

Each link 114 may be a direct link (e.g. a direct wireless link between mobile stations 110), or may consist of a number of links interconnected by intermediate devices (not shown), e.g. by access points in an IEEE 802.11 type network. A link 114 may be a physical link (e.g. a piece of wire, or a band of wavelengths or time slots in transmissions over wire or wireless media), or may be a logical link. A logical link is a link that may be associated with different physical links at different points of time. For example, in some embodiments, a link 114-i,j is defined as data traffic between the stations 110.i and 110.j (we use "station" and "device" interchangeably herein). The data is transmitted in frames (FIG. 2) each of which includes a source address (SA) and a destination address (DA), and the link 114-i,j is defined as the frames in which one of the source and destination addresses is the station 110.i and the other one of the source and destination addresses is the station 110.j. In addition, the link may contain multicast and broadcast frames transmitted between the two stations. Alternatively, the link may be identified by a transmitting address (TA, not shown) and a receiving address (RA, not shown), which are addresses of the transmitting and receiving stations respectively. The transmitting and/or receiving stations may be intermediate stations in a path between the initiating station (identified by SA) and the final destination (DA).

Figure 3:
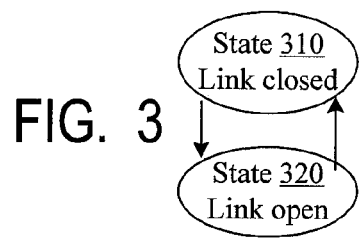
FIG. 3 shows some states of a network station or link according to some embodiments of the present invention.

In some embodiments, a link 114-i,j is called closed if at least one of the two devices 110-i, 110-j interconnected by the link somehow restricts the link's traffic or restrict processing of data received over the link. We will assume that the link has at least two states: closed (state 310 in FIG. 3) and open (state 320). There may be many such states, and closing of the link refers to some restrictions on the link operation compared to the link being "open". For example, in some embodiments, if a link 114-i,j is in state 310, then one of the devices interconnected by the link (e.g. device 110.i) does not send any messages to the other device (110.j) and drops any message from the other device. In other embodiments, device 110.i only processes those messages on the link which aim at changing the link status (e.g. request to open the link). In some embodiments, the link is "closed" if it is deauthenticated. Stations may still be able to transmit data over an unauthenticated link. In some embodiments, the link is "closed" if at least one of the devices interconnected by the link would need to authenticate itself again if it wishes to engage in secure communications with the device on the other end of the link. A device 110.i may want to close all open links to any other devices if the user of device 110.i signs off for example.

In some embodiments, a device 110 stores the link states in its storage 110S, as shown at 114S in FIG. 1. In some embodiments, the device may store only the states of the links connected to the device.

Some embodiments of the invention use a one-way hash function $f(\ )$. "One-way" may mean that given a random element y, it is hard to find a pre-image z such that $f(z)=y$. For example, given the available computing power, finding a pre-image z may take 10,000 years, so a human adversary would be unable to enjoy the benefit of finding a pre-image. "One-way function" is sometimes defined as a function that satisfies the following properties:

(a) Given a random element y in the range of $f$, it is computationally infeasible to find a pre-image z such that $f(z)=y$.

(b) However, it is feasible to compute $f(x)$ for any input x in the domain of $f$.

"Computationally infeasible" means that given a security parameter κ, the computation cannot be computed in a time equal to or less than any fixed polynomial in κ except with negligible probability (the probability is negligible in the sense that it approaches zero faster than the reciprocal of any polynomial in κ when κ approaches infinity). The security parameter κ can be chosen in different ways, and typically is some number smaller than or equal to the input size of $f(z)$, e.g. $κ≦|Z|$ (i.e. the bit length of z). "Feasible to compute" means not computationally infeasible.

It is generally believed in the art that the following functions are one-way: SHA-1 (see [1]) and MD5 (see e.g. RFC-2104, Request for Comments, Networking Working Group, H. Krawczyk et al., *HMAC: Keyed-Hashing for Message Authentication*, February 1997, both incorporated herein by reference).

Figure 4A:
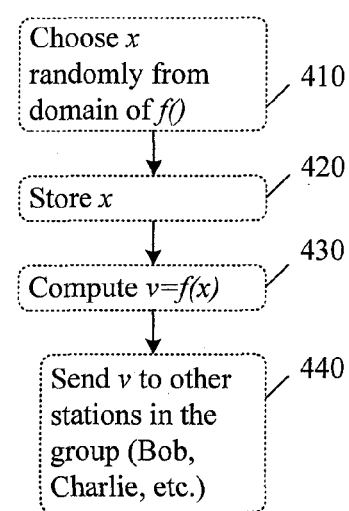
FIG. 4A is a flowchart of a method executed by a network station during a set-up according to some embodiments of the present invention.
Figure 4B:
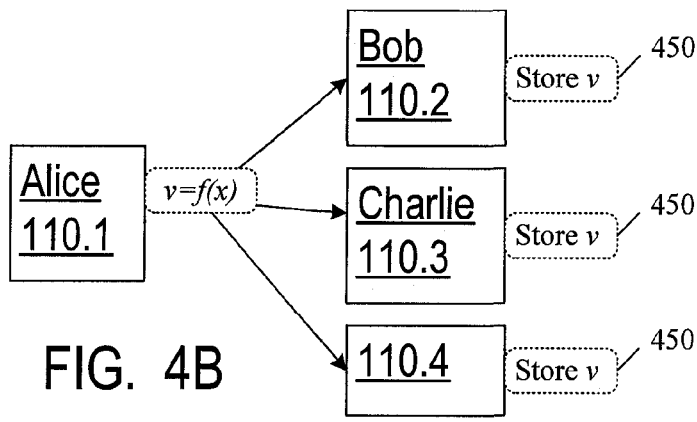
FIG. 4B shows data flow and operations performed by network stations during a set-up according to some embodiments of the present invention.

FIGS. 4A, 4B illustrates a protocol for a device "Alice" (i.e. 110.1) to set up a group value v with devices "Bob" (110.2), "Charlie" (110.3), and device 110.4 in a way that will allow Alice to close all communication links to devices 110.2-110.4 securely and efficiently. As will be obvious to one skilled in the art, the same protocol can be used for a group containing any number of two or more devices 110. FIG. 4A is a flowchart of the method performed by device 110.1. FIG. 4B illustrates data flow between devices 110 and also illustrates some operations performed by the devices. Let $f$ be a one-way function that is agreed on by all devices 110. Device 110.1 generates an input x to $f$ from a random probabilistic distribution on the domain of $f$ (step 410). The probabilistic distribution may or may not be uniform. In some embodiments, the function $f$ is one-way with respect to this probabilistic distribution (it is impossible to find a pre-image x of a value y in the range of $f$ in a polynomial time except with negligible probability as defined by that distribution). Device 110.1 stores the input x in its storage 110S (step 420). Then device 110.1 computes the group value $v=f(x)$ (step 430), and sends this group value to the other devices 110.2, 110.3, 110.4 in the group (step 440). In some embodiments, the group value v is authenticated (e.g., with Alice's digital signature constructed using Alice's secret key and verifiable by stations 110.2-110.4 with Alice's public key). in some embodiments, the group value v is encrypted, with a decryption key known to the devices 110.2-110.4. The authentication and the encryption are not however necessary. In addition to serving to close the links, the group value v can also be used as a shared secret key for encrypted communications between the stations 110 while the links are open. In this case, the authentication and encryption are desirable.

Each station 110.2-110.4 stores the group value in its respective storage 110S, as shown in FIG. 4B at 450.

Figure 5A:
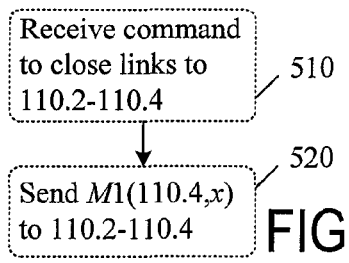
FIG. 5A is a flowchart of a method executed by a network station according to some embodiments of the present invention.
Figure 6:
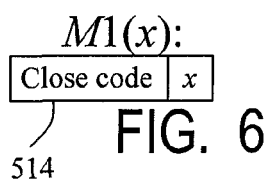
FIG. 6 illustrates data transmitted according to some embodiments of the present invention.
Figure 5B:
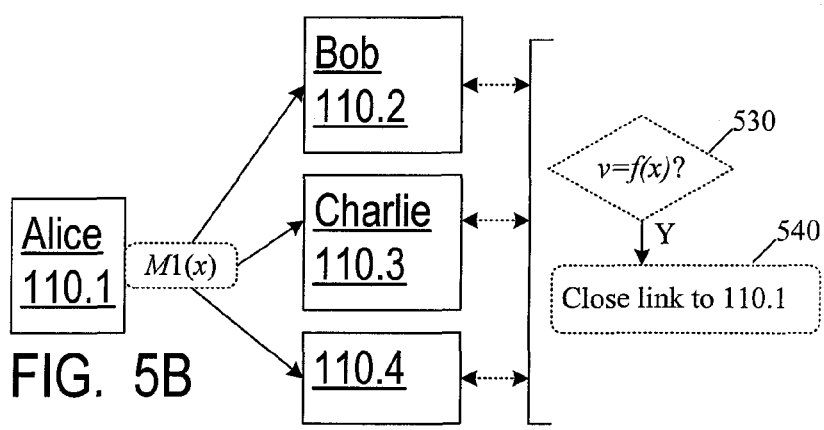
FIG. 5B shows data flow and operations performed by network stations according to some embodiments of the present invention.

FIGS. 5A, 5B illustrate a protocol for the device 110.1 closing of communication links to devices 110.2, 110.3, 110.4 in accordance with one embodiment of the present invention. FIG. 5A shows the operations performed by station 110.1, and FIG. 5B shows data flow between the stations and some operations performed by stations 110.2-110.4. At step 510 (FIG. 5A), device 110.1 receives a command (say, from Alice, or from some application running on the device) to close all communication links 114 to devices 110.2-110.4. At step 520, device 110.1 sends (possibly broadcasts) a link-closing message M1(x) (see FIG. 6) to devices 110.2, 110.3, 110.4. The message contains a "close" code 514 to indicate link closure, and also contains the input value x that was stored at step 420. The message M1 may consist of one or more frames. Then device 110.1 closes down its side of each communication link to devices 110.2-110.4. In some embodiments, this involves the device 110.1 marking the links' state in the device's storage 114S, possibly deleting the links' states from the storage.

When each device 110.2-110.4 receives the link close request M1 which purportedly comes from device 110.1, each device 110.2-110.4 checks that when $f$ is applied to the input x, the result is the group value v. See step 530 in FIG. 5B. If so, the devices 110.2-110.4 close the communication links to device 110.1 (step 540). The closing may involve updating the links' states the devices' storage 114S and/or some other actions. If $v \neq f(x)$, the devices 110.2-110.4 perform some other actions, possibly keeping the links open.

Advantageously, if an attacker gets control of station 110.2, 110.3, or 110.4, the attacker will not be able to issue a link closing request M1(x) to cut off communication with station 110.1 because the attacker does not have the input value x. Thus, it is more difficult for the attacker to close the links to perform a denial-of-service attack on station 110.1 or for some other purpose (e.g. impersonating the station 110.2 in communicating with station 110.1).

In some embodiments, each station 110.2-110.4 executes the methods of FIGS. 4A, 5A (each station chooses its own value x, with the same or different one-way function $f$). Thus, each station in the group can securely close the communication links with all the other stations in the group.

As noted above, a link 114 may have more than two possible states. A single group value v can be used to authenticate different types of state transitions. For example, v can be set to $f(f(x))$. For some state transitions (state transitions of a "first type"), station 110.1 sends the value x to stations 110.2-110.4, as at step 520. Stations 110.2-110.4 perform the authentication by checking that $v=f(f(x))$ at step 530. For a "second type" of state transitions, the station 110.1 sends the value $x_1=f(x)$. Stations 110.2-110.4 perform the authentication by checking that $v=f(x_1)$. Advantageously, only one value v has to be distributed at step 440. Also, if a second-type transition has been executed but a first-type transition has not, the value x remains secure even if the value $x_1$ has been intercepted by the attacker.

Figure 7:
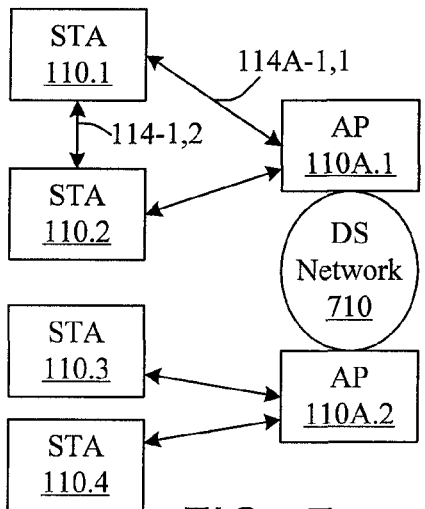
FIG. 7 is a block diagram of a network for some embodiments of the present invention.

Consider for example an IEEE 802.11 network of FIG. 7. Wireless stations 110.1, 110.2 communicate with each other over a direct wireless link 114-1,2 (in the 802.11 terminology, these stations are part of a Basic Service Set, or BSS). Stations 110.1, 110.2 cannot communicate directly with stations 110.3, 110.4, and the stations 110.3, 110.4 also cannot communicate directly with each other. Direct communication may be impossible if distances between the stations are not matched by the strength of the wireless signal. When direct communication is impossible, stations 110 communicate via access points (AP) 110A.1, 110.2, which in turn communicate with each other via a "distribution system" network 710.

Figure 8:
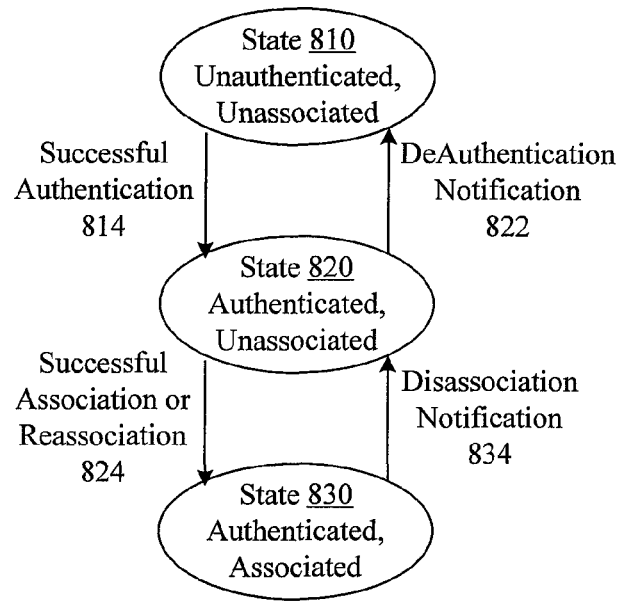
FIG. 8 shows some states of a network station or link according to some embodiments of the present invention.

Let us suppose that the station 110.1 wants to send a message to access point 110.1 over direct wireless link 114A-1,1. The sending station 110.1 may be in one of three states with respect to the receiving station 110A.1, as shown in FIG. 8. Initially (state 810), station 110.1 is Unauthenticated and Unassociated. In this state, station 110.1 can send an authentication request to station 110A.1, and can send other data but cannot use the station 110A.1 for access to DS network 710. Upon successful authentication, a state transition 814 is performed to place the station 110.1 in state 820 (Authenticated, Unassociated). In state 820, station 110.1 can send a DeAuthentication Notification to return to state 810 (as shown by state transition 822). In state 820, station 110.1 can also send an association request or a reassociation request. Reassociation refers to association with AP 110A.1 accompanied by de-association with respect to some other AP. (Under standard 802.11, a station can be associated with at most one AP at any given time.) Upon successful association or reassociation (state transition 824), station 110.1 enters state 830 (Authenticated, Associated). Only in this state the station 110.1 can use AP 110A.1 for access to network 710. If station 110.1 sends a disassociation notification to AP 110A.1 in state 830, station 110.1 returns to state 820 (state transition 834).

In some embodiments, station 110.1 records its state in its storage 114S (FIG. 1) for each link 114 connected to station 110.1.

States 810, 820 also describe the state of a sending station when the receiving station is not an AP (e.g. when the sending station is 110.1 or 110A.1 and the receiving station is 110.2).

The states 810, 820, 830 can be viewed as states of link 114A-1,1 with respect to the sending station 110.1.

Link 114-1,2 can be in states 810, 820, but not 830 because the station 110.2 is not an access point of a DS network.

Figure 9:
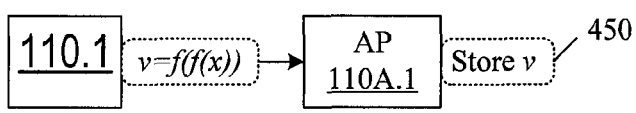
FIG. 9 shows data flow and operations performed by network stations during a set-up according to some embodiments of the present invention.

FIG. 9 illustrates a protocol for station 110.1 to set up a group value v for device 114A.1 to enable authenticated state transitions for the link 114A-1,1 as in FIG. 8. The protocol is identical to that of FIG. 4A, except that at step 430 the station 110.1 sets $v=f(f(x))$.

At step 440, station 110.1 sends the value v to AP 110A.1. The value v can be sent as a data frame, with the frame control DS bit being false to indicate that the frame should not be transferred to network 710. The data frame can be sent in any of the states 810, 820, 830. If desired, the data frame can be encrypted and/or authenticated.

AP 110A.1 stores the v value in its storage, as shown at 450 in FIG. 9.

Figure 10A:
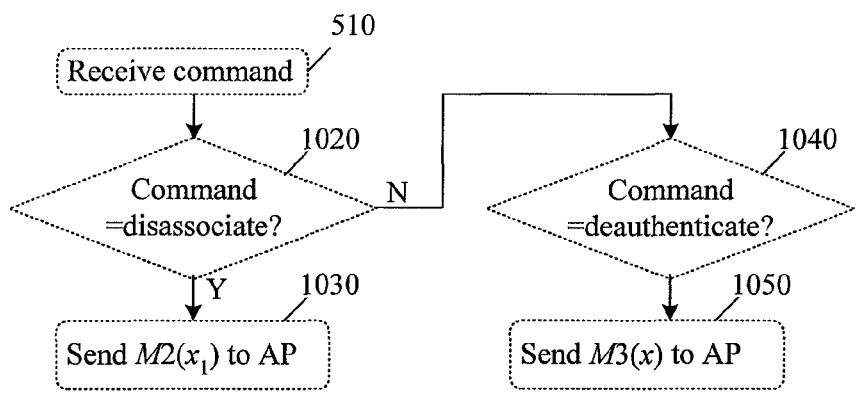
FIG. 10A is a flowchart of a method executed by a network station according to some embodiments of the present invention.

FIGS. 10A, 10B illustrate the operation of stations 110.1, 110A.1 performed to deauthenticate or disassociate the link 114-1,1. At step 510, station 110.1 receives a command (say, from the station's user or some application running on the station) to either deauthenticate (transition 822 in FIG. 8) or disassociate (transition 834) the link 114A-1,1. (For example, if the station's user signs off, the sign-off procedure may issue both commands in sequence.) If the command is "disassociate" (as determined at step 1020), station 110.1 computes $x_i=f(x)$, or retrieves the value xi from its storage if this value was stored at the set-up stage (FIG. 9) when the value v was computed. Station 110.1 inserts the value xi into a message M2 (FIG. 11), together with a disassociation notification. Station 110.1 then sends this message $M2(x_1)$ to AP 110A.1 (step 1030 in FIG. 10). If the command is "deauthenticate" (step 1040), station 110.1 inserts the value x into a message M3 (FIG. 12), which also includes a deauthentication notification. Station 110.1 sends this message M3(x) to AP 110A.1 (step 1050). Station 110.1 also updates the link state in the station's storage 114S.

When AP 110A.1 receives the disassociation message $M2(x_1)$, as determined by the AP at step 1060 of FIG. 10B, AP 110A.1 uses the value $x_1$ in the message to compute $f(x_1)$, and compares $f(x_1)$ to the AP's stored value v (step 1064). If the two values coincide, AP 110A.1 performs its part in the disassociation of station 110.1 (step 1070). This may involve updating the AP's storage 114S (FIG. 1) to indicate the disassociation. The AP will not then forward messages between DS network 710 and station 110.1. If the test of step 1064 fails, the AP does not perform the disassociation.

If AP 110A.1 receives a deauthentication message M3(x), AP 110A.1 uses the value x in the message to compute $f(f(x))$, and compares $f(f(x))$ to the AP's stored value v (step 1080). If the two values coincide, AP 110A.1 performs its part in the deauthentication of station 110.1 (step 1084). This may involve updating the AP's storage 114S (FIG. 1) to indicate the deauthentication. Otherwise, the AP does not perform the deauthentication.

In some embodiments, the deauthentication is allowed even if the link is in state 830. In this case, the deauthentication is accompanied by disassociation. Thus, the value $x_1$ can be viewed as indicating the link's final state (e.g. state 810) rather than a state transition (such as 822).

Of note, since the disassociation 834 is usually performed before the deauthentication 822, the deauthentication is secure even if the value xl is compromised during the disassociation. However, some embodiments use xl for deauthentication and use x for disassociation.

In some embodiments, the same value v is used for multiple links. For example, in some embodiments, the value v is used for a group of stations 110.1, 110A.1, 110.2. At the set-up time, station 110.1 provides the value $v=f(f(x))$ to stations 110A.1 and 110.2. When the user signs off, the station 110.1 broadcasts the value x to stations 110A.1, 110.2. Each of these stations deauthenticates the respective link 114A-1,1, 114-1,2. If the user of station 110.1 merely wants to stop using the AP 110A.1 for access to DS network 710, station 110.1 broadcasts the value $x_1=f(x)$. Station 110A.1 verifies that $f(x_1)=v$, performs disassociation 834. Station 110.2 tests that $f(f(x_1))=v$. The test fails, so the station 110.2 performs no action on the link state.

In some embodiments, similar techniques are used when AP 110A.1, or some other AP, terminates its services. For example, when the AP authenticates or becomes associated with a non-AP station 110, the AP can provide to the non-AP station a group value v generated in advance, at the AP set-up stage, as in FIG. 4A or 9. When the AP receives a command to terminate its services, it sends disassociation requests to all the non-AP stations with which the AP is currently associated. The disassociation messages can be accompanied by a value x such that $f(x)=v$, or such that $f(f(x))=x$. Also, in the latter case, the AP may de-authenticate selected non-AP stations, and may send to such stations a value $x_1=f(x)$. The receiving stations authenticate the disassociation or deauthentication requests as in FIG. 5B or 10B for example.

In some embodiments (possibly other than the 802.11 embodiments), a station 110.1 may communicate through multiple AP's at the same time, and the techniques of FIGS. 1-12 can be used to close (e.g. deauthenticate and/or disassociate) multiple links between the station 110.1 and the multiple AP's.

Multiple applications of function $f$ can be used for any number of link states or state transitions. Given a number m of states or state transitions, we define a hash chain as a sequence of values $x_0, \ldots, x_{m-1}$ where:

$$x_0=x, x_1=f(x), x_2=f(f(x)), \ldots, x_{m-1}=f^{m-1}(x) \quad (1)$$

(Hash chains are described in U.S. patent application published as no. 2006/0059333-A1 on Mar. 16, 2006 (application Ser. No. 11/218,093) entitled "Revocation of Cryptographic Digital Certificates", incorporated herein by reference.) We set the group value $v=x_{m-1}$. Every other value $x_i$ ($0 \leq i < m-1$) is associated with a link state or state transition. Station 110.1 (FIG. 1) initially keeps all the values $x_i$ ($0<i<m-1$) secret except the group value v. At the set-up stage (FIG. 9), station 110.1 transmits v to other stations in the group, which store this value (step 450). Then, if station 110.1 receives a command that one or more links connected to station 110.1 must be placed into some state or undergo some state transition, station 110.1 sends an appropriate command and the corresponding value $x_i$ to the other stations 110 in the group. This is similar to step 440 of FIG. 4A. Upon receipt of $x_i$, each receiving station 110 checks that $$f^{m-1-i}(x_i)=v \quad (2)$$

This is similar to step 530 of FIG. 5B. If the equality (2) holds, the receiving station 110 performs the appropriate actions to accomplish the desired state transition for the link and/or otherwise place the link into the desired state. This is similar to step 540. If (2) is false, the station 110 does not perform such actions for the link as the command may be issued by an attacker.

The aforementioned U.S. patent application 2006/0059333-A1 is directed to revocation of digital certificates. In some digital certificate schemes, a certificate authority (CA) issues validity proofs for valid certificates. For each certificate, different validity proofs are issued for different times to prevent an attacker from forging a validity proof after the certificate has been invalidated. The digital certificate schemes can be used for authenticating a command to change a link state as described above. Instead of using $x_i$ in (1) as a validity proof for a digital certificate for a time period i, we use $x_i$ to authenticate a command for a link state transition corresponding to the index i.

To reduce the number of hashing operations (applications of function $f$) at the verification stage (2), hash chains (1) can be replaced with hash trees as described in the aforementioned U.S. patent application 2006/0059333-A1. A hash tree (FIG. 13) is a tree data structure associated with some "hash" function $f$. In FIG. 13, the tree nodes are numbered from top to bottom, left to right, breadth first. Thus, the root is labeled "t0", its children are labeled "t1" and "t2", and so on. This labeling scheme is for ease of reference and is not limiting. Each node ("vertex") t is assigned a value V(t). The value V of each parent node is computed from the values of the children using the function $f$. For example, in some embodiments, the parent's value is obtained by applying the function $f$ to a string composed of all the children's values concatenated starting from the left child. Thus, for the root node, $$V(t0)=f(V(t1)\|V(t2)) \quad (3)$$

where $\|$ denotes string concatenation. The tree of FIG. 13 has nodes with two children and nodes with a single child (e.g. t7). We assume that each value V is representable as a string of a length n, where n can be any positive integer. The function f maps $\{0,1\}^{2n}$ (the set of binary strings of length 2n) and $\{0,1\}^n$ into $\{0,1\}^n$. In FIG. 13, each leaf (t15 through t22) has a single parent, so the value of the parent is the function $f$ on the child's value. For example, $V(t7)=f(V(t15))$.

The leaf nodes' values are randomly generated. The group value v is the root value V(t0).

Each link state or state transition is associated with a leaf node. (Depending on the tree structure, there may be "spare" leaf nodes, not associated with any link state or state transition.) In FIG. 13, possible link states or state transitions are labeled p1 through p8. The invention is not limited to any number of states or state transitions.

For each state or transition pi (i=1, . . . , 8), we denote the corresponding leaf as LF(pi). For example, LF(p1)=t15.

The term "tree" denotes any computer data structure together with a method for determining the parent from a child node and/or the children from the parent. The data structure may include pointers from the children nodes to the parent and/or from the parent to the children. Alternatively, the nodes may be arranged as an array or some other structure, with no pointers, but with a method, implemented by computer instructions, which determines the parent from a child node and/or the children from the parent.

FIG. 14 illustrates the set up procedure perform by a station such as 110.1 of FIG. 1 to set up a group value. At step 1410, the station constructs a suitable tree based on the number of link states or state transitions. At step 410, random values are assigned to the leafs. At step 420, the leafs' values, and possibly (but not necessarily) other nodes' values are stored in the storage of station 110.1. At step 430, the group value v=V(t0) is computed, and at step 440 the group value is transmitted to the other stations in the group (e.g. 110.2-110.4 in FIG. 1). Station 110.1 may also send to the other stations the tree structure and the association between the link states or transitions and the leaf nodes, but station 110.1 does not send the tree node values other than v. The other stations store the group value v and the tree structure.

FIG. 15A illustrates the operation of station 110.1 when the station receives a command to change states of links or perform state transitions (step 510). An exemplary command may be to close all links to station 110.1 (e.g. when the user of station 110.1 signs off), or to partially close the links (e.g. perform the transition 834 of FIG. 8 on reassociation). As stated above, these states or transitions are shown as p1 through p8 in FIG. 13. At step 1520, for the command for a state or state transition pi, station 110.1 determines the corresponding leaf node LF(pi). At step 1530, station 110.1 sends to the other stations in the group a command (which could be just a notification) to place their links to station 110.1 into the appropriate state, or to perform the appropriate state transition. Station 110.1 also sends to the other stations the leaf node's value V(LF(pi)) and additional information to allow the other stations to compute the root value V(t0) to authenticate the command. In some embodiments, the additional information includes the values of the remaining leafs. In other embodiments, the additional information includes the values of conodes of the leaf LF(pi). The conodes of a node are just those nodes whose values are needed to compute the root value. For example, the conodes of node t17 are t10, t3, t2. For any node t, its set of all conodes is denoted as CoNodes(t) and is defined as the set of all siblings of the nodes on the path from t to the root. CoNodes(t) can be defined for both leaf and non-leaf nodes as follows:

$$CoNodes(t) = \emptyset \text{ (empty set) if } t \text{ is the root;} \quad (4)$$

$$Sib(t) \cup CoNodes(Parent(t)) \text{ otherwise.}$$

Here Sib(t) is the (possibly empty) set of all siblings of t, and Parent(t) is the parent node of t.

As stated above, at step 1530, station 110.1 sends to the other stations in the group the leaf node's value V(LF(pi)) and additional information to allow the other stations to compute the root value V(t0). In some embodiments, this additional information, denoted as V(CoNodes(LF(pi))), includes the values of the conodes of LF(pi) and may also includes the conode information needed to compute the root value V(t0).

For each conode, the other stations may need to know whether this is a right conode or a left conode (if the concatenation order in (3) is significant). If the tree structure was provided to the other stations at step 440 as in FIG. 14, the stations can determined this information from the tree structure, so the conode values are sufficient. In some embodiments, station 110.1 does not provide the tree structure to the other stations at step 440, so V(CoNodes(LF(pi))) includes not only the conode values but also the order in which the conode values must be concatenated for equation (3). For example, for node t17=LF(p3), V(CoNodes(t17)) can be represented as a list:

$$(R, V(t10)); (L, V(t3)); (R, V(t2)) \quad (5)$$

Here L and R are values of a one-bit flag indicating if the co-node must be on the left or the right in the concatenation.

At step 1540 (FIG. 15B), each receiving station 110.2-110.4 receives the information transmitted at step 1530. The receiving station computes the root value V((t0)) from V(LF(pi)) and the additional information V(CoNodes(LF(pi))) using the function ƒ (see (3) for example). At step 530, the receiving station compares the computed root value with the value v transmitted at step 440 (FIG. 14). If the two values are equal, the receiving station performs any operations that may be needed to update the state of the link between the receiving station and station 110.1 (step 540). Otherwise, the receiving station does not perform any action or may perform some other action, e.g. log in an error.

FIG. 16 shows a "dense hash tree" which can be used instead of the tree of FIG. 13. The tree of FIG. 16 is a balanced binary tree. The periods pi are associated with "grey" nodes, marked with hatching. The non-grey nodes will be called "white". The grey and white nodes are determined as follows. The root t0 is white. Its left child t1 is grey, and the right child t2 is white. In general, each left child is grey, and each right child is white. The grey nodes are traversed top-down, left-to-right, breadth first, and the consecutive gray nodes are assigned to consecutive periods pi. Thus, p1 is associated with t1, p2 with t7, p3 with t9, and so on. At step 410 (FIG. 14), all the leafs are assigned some random or pseudo-random values, and the parents' values are computed from the children's values like for FIG. 13. The operation of stations 110.1-110.4 is as for FIG. 13.

FIG. 17 shows a "grounded dense hash tree" which can be used instead of the trees of FIGS. 13 and 16. The tree of FIG. 17 is similar to the tree of FIG. 16, but the tree of FIG. 17 has an additional bottom layer of single children, shown as t7-t10. The grey nodes are the left children and the single children, numbered top to bottom and left to right, breadth first. The operation of stations 110.1-110.4 is as for FIG. 13.

Thus, some embodiments provide a computer-implemented method for securely modifying a state of one or more communication links 114 by a group of computer systems (e.g. 110 or 110A) in a computer network, the group comprising a first computer system (e.g. 110.1) and one or more other computer systems, the method comprising (1) the first computer system randomly selecting one or more first values (e.g. steps 410 in FIGS. 4A, 14); (2) the first computer system computing a group value (v) as a first function of the one or more first values (e.g. steps 430); (3) the first computer system performing a network transmission for providing the group value but not the one or more first values to the one or more other computer systems (e.g. steps 440); (4) after the operation (3), the first computer system obtaining a command for changing a state of one or more of the communication links (e.g. steps 510 in FIGS. 5A, 10A, 15A); (5) in response to the command, the first computer system performing a network transmission to the one or more other computer systems for providing an indication to change the state of the one or more of the communication links (e.g. an indication may be the message M1 or M2 or M3 in FIGS. 6, 11, 12; see also steps 520, 1030, 1050 in FIGS. 5A, 10A; the indication may be the data sent at step 1530 of FIG. 15A), the indication comprising authentication data (e.g. x, $x_1$, or the data at step 1530) to authenticate the indication to the one or more other computer systems, the authentication data comprising one or more second values which are either (i) one or more first values (e.g. x or V(LF(pi))), or (ii) intermediate values (e.g. $x_1$, or a conode value) obtained in computing the group value in the operation (2). In some embodiments, the method further comprises at least one of the computer systems in the group: obtaining a cryptographic key as a predefined identity or non-identity function of the group value; and transmitting and/or receiving a message to or from a computer system in the group, and performing a cryptographic operation on the message with the cryptographic key, the cryptographic operation comprising at least one of (i) encrypting the message, (ii) decrypting the message, (iii) generating a digital signature on the message, (iv) verifying a digital signature on the message. For example, the group value v can serve as the cryptographic key (in this case the cryptographic key is the identity function of the group value), or the cryptographic key can be some non-identity function of the group value (and possibly other values, e.g. some identifications of the stations in the group). In some embodiments, the operation (5) comprises the first computer system determining whether the command is for performing a first type of change of the state of the one or more communication links (e.g. transition 822 or entering state 810 via transition 822 or a combination of transitions 834, 822) in FIG. 8, or a second type of change of the state of the one or more communication links (e.g. transition 834); wherein the one or more second values depend on whether the command is for performing the first type of change or the second type of change (e.g. x or $x_1$ in FIG. 10B, or values depending on pi as in FIG. 15A at steps 1520, 1530).

Some embodiments provide a computer-implemented method for securely modifying a state of one or more communication links by a group of computer systems, the group comprising at least a first computer system and a second computer system (e.g. 110.2 or 110A.1), the method comprising: (1) the second computer system obtaining a group value via a network transmission from the first computer system; (2) after the operation (1), the second computer system receiving a network transmission comprising an indication to change the state of the one or more communication links, the indication comprising authentication data to authenticate the indication to the second computer system, the authentication data comprising one or more authenticating values; (3) the second computer system computing a predefined function (e.g. $f(x)$, or $f(f(x))$, or the root value $V(t_0)$) of the one or more authenticating values and determining whether or not the predefined function of the one or more authenticating values is in a predefined relationship to the group value (for example, the relationship can be that the predefined function of the group value equals the group value as at steps 530, 1064, 1080; or some other relationship is possible, e.g. some function H($f(x)$,v)=h where H is a predefined function, and h is a predefined value); (4) if the predefined function of the one or more authenticating values is in a predefined relationship to the group value, then the second computer system processing the indication as a valid indication (e.g. steps 540, 1070, 1084), and otherwise the second computer system processing the indication as an invalid indication (e.g. no action or creating an error log).

The invention is not limited to the embodiments described above. In particular, the invention is not limited to one-way functions. Of note, the term "one-way function" was defined as a function which cannot be inverted in a polynomial time except with a negligible probability. However, for a large polynomial P($\kappa$), the security may be adequate for at least some applications even if a pertinent function can be inverted in the polynomial time P($\kappa$) with a non-negligible probability. Also, the negligible probability was defined as approaching zero faster than the reciprocal of any polynomial. If a polynomial is large, then its reciprocal is small, and adequate security can be obtained even if the pertinent probabilities are not negligible (i.e. are equal to or greater than the reciprocal of some polynomial). In some embodiments, the functions f may or may not be one-way but is such that if x is drawn from the function's domain with a uniform distribution or some other probabilistic distribution, the probability is small to find a pre-image of any given value y in the function's range:

$$P\{f(x)=y\} \leq \alpha$$

where $\alpha$ is a small constant (e.g. $\frac{1}{10}$, or $\frac{1}{100}$, or $2^{-25}$, or $2^{-50}$, or $2^{-80}$, or $2^{-160}$, or some other value). The invention is not limited to the step sequences shown in the flowcharts, as the step order is sometimes interchangeable and further different steps may be performed in parallel.

The invention includes computer systems adapted to perform the methods described above; data carriers with computer data representing values described above; and data carriers with computer instructions for computers to perform the methods described above. The data carriers may include computer readable media (disks, semiconductor memories, and other types, known or to be invented) and network links (including wire and wireless links).

Other embodiments and variations are within the scope of the invention, as defined by the appended claims.

The following references are incorporated herein by reference:

[1] FIPS 180-1, Secure Hash Standard. U.S. Department of Commerce/NIST, 1995.
[2] IEEE 802.11, 1999 Edition. Wireless LAN Medium Access Control (MAC) and Physical Layer (PHY) specifications. IEEE Computer Society, 1999.
[3] R. C. Merkle. Protocols for Public-Key Cryptography. In IEEE Symposium on Security and Privacy, 1980.
[4] S. Micali. Efficient Certificate Revocation. In Proceedings of the RSA Data Security Conference 1997. Also U.S. Pat. No. 5,666,416.

The invention claimed is:

1. A computer-implemented method for securely modifying a state of one or more communication links by a group of computer systems in a computer network, the group comprising a first computer system and one or more other computer systems, the method comprising:
   (1) the first computer system randomly selecting one or more first values;
   (2) the first computer system computing a group value as a first function of the one or more first values;
   (3) the first computer system performing a network transmission for providing the group value but not the one or more first values to the one or more other computer systems;
   (4) after the operation (3), the first computer system obtaining a command for changing a state of one or more of the communication links, each communication link being operable to carry network traffic in the computer network, each state defining one or more restrictions or an absence of the one or more restrictions in communicating over the computer link;

(5) in response to the command, the first computer system performing a network transmission to the one or more other computer systems for providing an indication to change the state of the one or more of the communication links, the indication comprising authentication data to authenticate the indication to the one or more other computer systems, the authentication data comprising one or more second values which are either (i) one or more first values, or (ii) intermediate values obtained in computing the group value in the operation (2), or (iii) a combination of one or more of the first values and one or more of the intermediate values;

wherein the authentication is to be performed by the one or more other computer systems without computing at least one second value from the group value;

wherein the operation (5) comprises the first computer system determining whether the command is for performing a first type of change of the state of the one or more communication links or a second type of change of the state of the one or more communication links;

wherein the one or more second values depend on whether the command is for performing the first type of change or the second type of change.

2. The method of claim 1 further comprising at least one of the computer systems in the group:

obtaining a cryptographic key as a predefined identity or non-identity function of the group value; and transmitting and/or receiving a message to or from a computer system in the group, and performing a cryptographic operation on the message with the cryptographic key, the cryptographic operation comprising at least one of (i) encrypting the message, (ii) decrypting the message, (iii) generating a digital signature on the message, (iv) verifying a digital signature on the message.

3. A computer system adapted to perform operations of the first computer system of the method of claim 2.

4. A non-transitory computer readable medium or media comprising one or more computer-executable computer instructions for a computer system to perform operations of the first computer system of the method of claim 2.

5. The method of claim 1 wherein the first function is a one-way function with respect to a probabilistic distribution used to randomly select the one or more first values.

6. A network transmission method comprising transmitting, over a network, a computer program comprising one or more computer instructions operable to cause a computer system comprising one or more processors to perform operations of a method recited in claim 5.

7. The method of claim 1 wherein the one or more communication links include a wireless link.

8. The method of claim 7 wherein the first computer system is mobile.

9. The method of claim 1 wherein the first function is a function $f^i$ where $f$ is a predefined function and i is a positive integer, and wherein the intermediate values comprise a value obtained by applying a function $f^j$ to the one or more first values, wherein j is an integer such that $0<j<i$.

10. A network transmission method comprising transmitting, over a network, a computer program comprising one or more computer instructions operable to cause a computer system comprising one or more processors to perform operations of a method recited in claim 9.

11. The method of claim 1 wherein the one or more first values are values of leafs of a hash tree, and the group value is a value of a root of the hash tree.

12. A computer system adapted to perform operations of the first computer system of the method of claim 1.

13. A non-transitory computer readable medium or media comprising one or more computer-executable computer instructions for a computer system to perform operations of the first computer system of the method of claim 1.

14. A network transmission method comprising transmitting, over a network, a computer program comprising one or more computer instructions operable to cause a computer system comprising one or more processors to perform operations of a method recited in claim 1.

15. A computer-implemented method for securely modifying a state of one or more communication links by a group of computer systems, the group comprising at least a first computer system and a second computer system, the method comprising:

(1) the second computer system obtaining a group value via a network transmission from the first computer system;

(2) after the operation (1), the second computer system receiving a network transmission comprising an indication to change the state of the one or more communication links, each communication link being operable to carry network traffic in the computer network, each state defining one or more restrictions or an absence of the one or more restrictions in communicating over the computer link, the indication comprising authentication data to authenticate the indication to the second computer system, the authentication data comprising one or more authenticating values at least one of which is not to be computed from the group value;

(3) the second computer system computing a predefined function of the one or more authenticating values and determining whether or not the predefined function of the one or more authenticating values is in a predefined relationship to the group value;

(4) if the predefined function of the one or more authenticating values is in a predefined relationship to the group value, then the second computer system processing the indication as a valid indication, and otherwise the second computer system processing the indication as an invalid indication;

wherein the operation (3) comprises the second computer system determining whether the indication is for a first type of change of the state of the one or more communication links or a second type of change of the state of the one or more communication links;

wherein the predefined function depends on whether the indication is for the first type of change or the second type of change.

16. The method of claim 15 further comprising the second computer system transmitting and/or receiving a message over a network and performing a cryptographic operation on the message with a key equal to the group value or a value obtained by the second computer system from the group value, the cryptographic operation comprising at least one of (i) encrypting the message, (ii) decrypting the message, (iii) generating a digital signature on the message, (iv) verifying a digital signature on the message.

17. The method of claim 15 wherein the predefined function is a function $f^i$ where $f$ is a predefined function and i is a positive integer dependent on whether the indication is for the first type of change or the second type of change.

18. A network transmission method comprising transmitting, over a network, a computer program comprising one or more computer instructions operable to cause a computer system comprising one or more processors to perform operations of a method recited in claim 17.

19. The method of claim 15 wherein the predefined function is a value of a root of a hash tree, the value of the root being the predefined function of values of predefined nodes of the hash tree.

20. The method of claim 15 wherein:
the predefined function is a value of a root of a hash tree, the value of the root being the predefined function of values of predefined nodes of the hash tree, the predefined nodes being defined based on whether the indication is for the first type of change or the second type of change.

21. A computer system adapted to perform operations of the second computer system of the method of claim 15.

22. A non-transitory computer readable medium or media comprising one or more computer-executable computer instructions for a computer system to perform operations of the second computer system of the method of claim 15.

23. A network transmission method comprising transmitting, over a network, a computer program comprising one or more computer instructions operable to cause a computer system comprising one or more processors to perform operations of a method recited in claim 15.

\* \* \* \* \*